(12) United States Patent
Guan et al.

(10) Patent No.: US 11,782,831 B2
(45) Date of Patent: Oct. 10, 2023

(54) MANAGING POWER LOSS IN A MEMORY DEVICE

(71) Applicant: Micron Technology, Inc., Boise, ID (US)

(72) Inventors: Huapeng G. Guan, Redwood City, CA (US); Frederick Adi, Castro Valley, CA (US); Jiangli Zhu, San Jose, CA (US); Yipei Yu, San Francisco, CA (US); Venkata Naga Lakshman Pasala, Milpitas, CA (US); Wei Wang, Dublin, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/464,350

(22) Filed: Sep. 1, 2021

(65) Prior Publication Data
US 2023/0065617 A1 Mar. 2, 2023

(51) Int. Cl.
*G06F 12/0804* (2016.01)
*G06F 12/1009* (2016.01)

(52) U.S. Cl.
CPC ...... *G06F 12/0804* (2013.01); *G06F 12/1009* (2013.01); *G06F 2212/1032* (2013.01); *G06F 2212/657* (2013.01)

(58) Field of Classification Search
CPC ............. G06F 12/0804; G06F 12/1009; G06F 2212/1032; G06F 2212/657
See application file for complete search history.

(56) References Cited

U.S. PATENT DOCUMENTS

| 11,016,889 | B1 | 5/2021 | Benjamin et al. |
| 2014/0006683 | A1 | 1/2014 | Ratn et al. |
| 2016/0246530 | A1* | 8/2016 | Mylavarapu .......... G06F 3/0616 |
| 2017/0139781 | A1* | 5/2017 | Camp ................. G06F 11/1451 |
| 2018/0081957 | A1* | 3/2018 | Johnston ............. G06F 16/2379 |
| 2019/0026224 | A1 | 1/2019 | Koo |

(Continued)

FOREIGN PATENT DOCUMENTS

KR 10-2019-0009573 A 1/2019

OTHER PUBLICATIONS

PCT Notification of Transmittal of The International Search Report and the Written Opinion of the International Searching Authority for PCT Application No. PCT/US2022/042267, dated Dec. 21, 2022, 10 pages.

*Primary Examiner* — Sean D Rossiter
(74) *Attorney, Agent, or Firm* — Lowenstein Sandler LLP

(57) ABSTRACT

A system for managing power loss can include a number of memory devices including a volatile memory device and a non-volatile memory device and a processing device operatively coupled with the plurality of memory devices. The processor can save a snapshot of a logical-to-physical (L2P) table to a non-volatile memory device and maintain a journal of updates of the L2P. The processor can, in response to a parameter of journal buffer of a volatile memory device satisfying a threshold criterion, save at least one journal of updates of the L2P table to the non-volatile memory device. It can also retrieve a sequence number from system metadata and save the most recent set of updates of the L2P table to a dedicated area of the non-volatile memory device, where the dedicated area is identified by the sequence number, in response to detecting a power loss event.

19 Claims, 6 Drawing Sheets

(56) References Cited

U.S. PATENT DOCUMENTS

| | | | |
|---|---|---|---|
| 2020/0379915 A1* | 12/2020 | Moertl | G06F 3/0626 |
| 2021/0081284 A1* | 3/2021 | Watt | G06F 11/076 |
| 2021/0200670 A1 | 7/2021 | Winterfield et al. | |
| 2022/0187999 A1* | 6/2022 | Lam | G06F 3/0625 |

* cited by examiner

MANAGING POWER LOSS IN A MEMORY DEVICE

TECHNICAL FIELD

Embodiments of the disclosure relate generally to memory sub-systems, and more specifically, relate to managing power loss in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
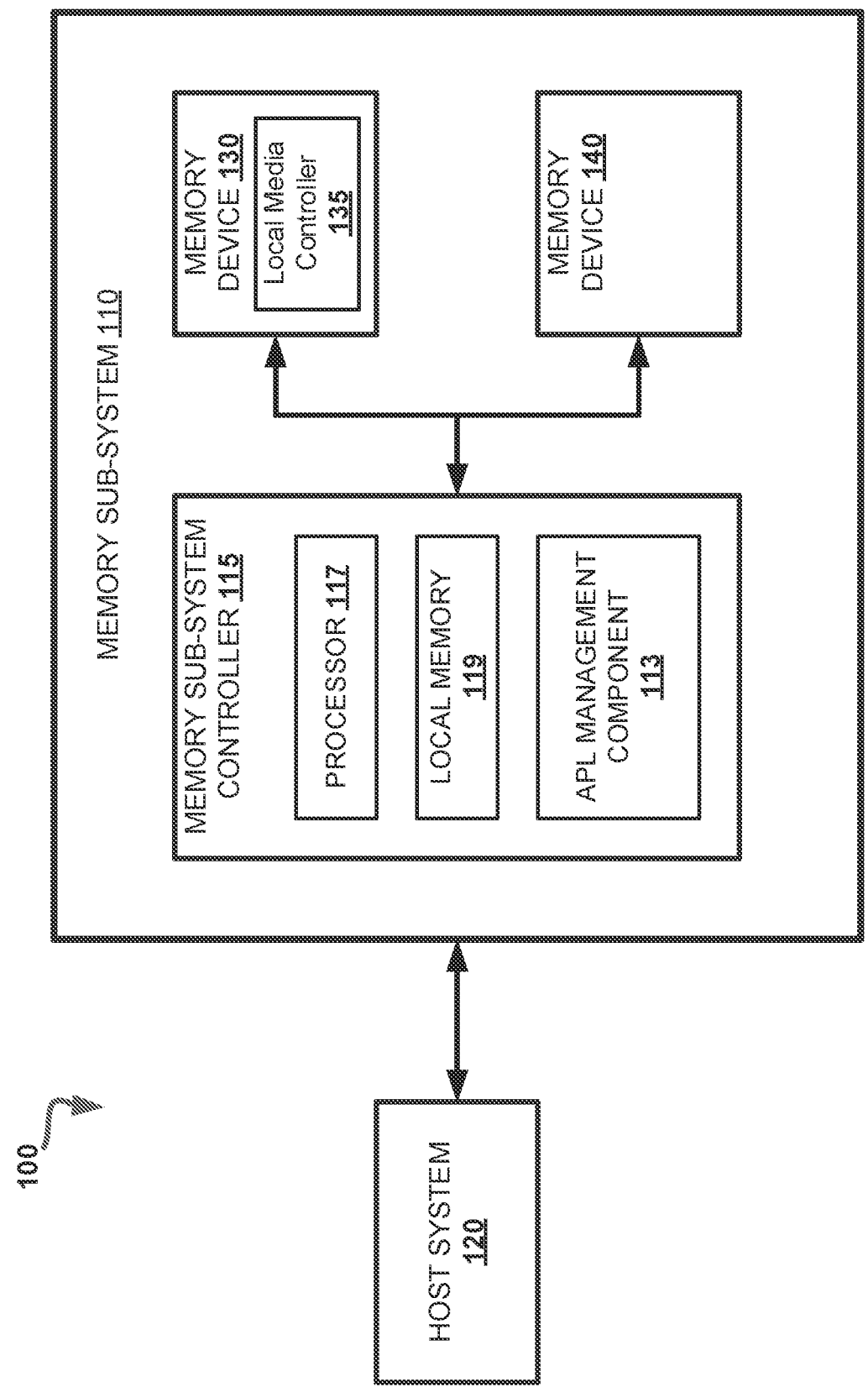
FIG. 1 illustrates an example computing system that includes a memory sub-system in accordance with some embodiments of the present disclosure.

Aspects of the present disclosure are directed to managing power loss in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include a two-dimensional grid of memory cells, which are formed onto a silicon wafer in an array of columns and rows A block hereinafter refers to a unit of the memory device used to store data and can include a group of memory cells that are electrically coupled to one or more conductive lines referred to as "wordlines." One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

Non-volatile memory devices can use a Flash Translation Layer (FTL) to translate logical addresses of memory access requests, referred to as logical block addresses (LBAs), to corresponding physical memory addresses, which can be stored in one or more FTL mapping tables. LBAs can be the logical addresses used by a host system for managing data. In some instances, the FTL mapping table can be referred to as a logical-to-physical (L2P) mapping table storing L2P mapping information. The L2P table can also be extended to contain various types of metadata such as system data and logs. Accordingly, the L2P table can be used to locate user data on a memory device. Portions of the L2P table can be retrieved from and written to the non-volatile memory device on demand, although in some devices, frequent read and/or write operations can cause performance degradation.

During operation, the L2P table can be maintained in a volatile memory device and have its entries updated as data is moved. However, an asynchronous power loss (APL) event may occur when at least some entries of the L2P table have not yet been written to the underlying non-volatile memory device, thus possibly leaving the L2P table in a state which is inconsistent with the state of memory devices. Accordingly, effective APL recovery strategies should be able to reconstruct the L2P table to a consistent state.

Therefore, in anticipation of a possible APL event, snapshots of the L2P table can be periodically saved to non-volatile memory device media (e.g., upon writing a certain number of data pages), such that the latest snapshot before the APL event could be used for APL recovery. However, such a snapshot would not reflect the L2P table updates that might have occurred between the last time an L2P was saved and the time of the APL event. Accordingly, a journal of recent L2P updates can be maintained in a volatile memory device and saved as an update journal in a non-volatile memory device, which may be utilized for applying the L2P changes that might have occurred between the last time the L2P table was saved and the APL event. Thus, the APL recovery may involve restoring the latest L2P table snapshot followed by applying the journaled L2P updates for the period starting from the time of saving the last snapshot.

For some non-volatile memory devices, the L2P table is reconstructed every time the device powers up or whenever the device is reset. Such power up or reset events can occur when there is an intentional power termination or when there is an unexpected sudden power loss such as an APL, after which recovery or reconstruction of L2P table information may be needed. However, because APL can leave data in an inconsistent state (e.g., when an APL occurs during a write operation being performed on the non-volatile memory device or during an update to the L2P table resulting in in consistent or missing metadata), having periodic snapshots and update journals saved to non-volatile memory device media may not be sufficient for an accurate reconstruction of the L2P table. Moreover, because in some cases the reconstruction of the whole L2P table takes a long time, a time-to-ready (TTR) requirement (i.e., a requirement for the memory device to be ready to perform operations within a specified time limit) can be violated on power up or reset. To address this issue, a memory sub-system can be equipped with one or more capacitors that would provide power to flush the user data and system metadata during power loss (i.e., to complete pending unfinished operations and save data and metadata such as the L2P table to non-volatile memory) and allow for a more rapid rebuilding on power up. The algorithms for performing this data flush can flush the system metadata to the same non-volatile memory area where normal run-time operations save system metadata. Then, the L2P table can be reconstructed from the non-volatile memory.

However, it may take a long time for completing the operations of updating the latest changes to the system metadata (e.g., updates to the L2P table). This, in turn, requires a relatively long power-sustaining time to permit the system to complete the pending operations. If insufficient power-sustaining time was provide to complete the operations that were pending upon the sudden power loss, some system metadata, such as the L2P table, may not be properly saved on the non-volatile media and would need a long time to be reconstructed upon power up, thus violating the TTR requirements.

Aspects of the present disclosure address the above and other deficiencies by having a memory sub-system that can save the most recent set of updates of the L2P table in the form of an update journal (that can be applied to the snapshot of the L2P table) to a dedicated area on a non-volatile memory device upon detection of a power loss (e.g., an APL). When the power loss is detected, power can be supplied to a processor by a capacitor for storing the last update journal on the NVM device. Then, upon power up, the last update journal can be found and can be combined with previous update journals and the snapshot of the L2P table to rebuild the latest L2P table.

Since only the last update journal to the L2P table along with system metadata is saved during a power loss, the required power sustaining time that a capacitor provides can be substantially reduced. The relatively short power sustaining time used to save the last set of updates permits the capacitor size and, consequently, cost to be reduced relative to a situation where a larger amount of data (e.g., a portion or the entirety of an L2P table) needs to be written or saved when a power loss is detected.

In some embodiments of the present disclosure, a memory device has a logical-to-physical (L2P) mapping table and metadata stored in volatile memory during run-time. A snapshot of the L2P table (i.e., a record of the current L2P mapping table together with system metadata) that is stored on a volatile memory device can be periodically flushed/saved on to a non-volatile memory device at a predetermined frequency. The snapshot of the L2P table can be saved to a dedicated area on the non-volatile memory device. The dedicated area of the non-volatile memory device can span over one or more management units (MUs), which can be physical or logical blocks of a predetermined size. In some embodiments, due to potential degradation of the medium performance caused by read and write cycles, the frequency between sequential saves of the snapshots may be adjusted or changed for the purpose of medium endurance management.

In some embodiments, as changes are made to the L2P mapping or the system metadata, the changes are journaled as updates to the L2P-mapping table residing in the volatile memory device. The volatile memory device can have a journal buffer that accumulates the aforementioned changes to the L2P mapping and metadata in a journal of updates until a threshold criterion being met (e.g., at a predetermined time, when the journal buffer is filled to a particular level, or when the journal buffer is full), at which point the journal of updates can be saved to the non-volatile memory device. This update journal can be saved in another dedicated area of the non-volatile memory device that is different from that where the snapshot is saved. In some embodiments, due to an accumulation of changes, the journal buffer can meet the threshold criterion more than once (i.e., multiple times) between each flushing/saving of the snapshot of the L2P table. Accordingly, the journal of updates can be saved to the non-volatile memory device multiple times during an interval of time between sequential saves of the snapshot of the L2P table. However, the most recent set of journaled updates may still be in the volatile memory device if they were made after the last time an update journal was saved to the non-volatile memory device.

To ensure that the latest changes to the L2P table are not lost during an APL, the most recent update journal (i.e., the most recent set of changes made to the L2P mapping table and system metadata) can be saved in yet another dedicated area of the non-volatile memory device. In one embodiment, one physical super management unit (PSMU), which is a block on a memory device made up of thousands of MUs, can be used as such an active dedicated area (also referred to herein as an active PSMU) to store the last update journal. This active PSMU can be used as a circular buffer of slots for update journals where each slot can have a predetermined number of management units (MUs) and can be identified by a sequential number. Each subsequent update journal can be written to the next sequential slot of the PSMU until all of the slots have been written to. When all the slots of the PSMU have been written to, the subsequent update journal can be written to the first slot of the active PSMU thus overwriting the data that may be present there. This process of saving each subsequent update journal in the next slot of the PSMU and restarting at the first slot of the PSMU is referred to as using the active PSMU as a circular buffer. In some embodiments, after each power up event, the next slot (i.e., the slot immediately subsequent to the last slot used for writing an update journal) of the PSMU of the non-volatile memory device can be initialized by retrieving (i.e., reading) the sequence number of the last slot and writing the incremented sequence number (i.e., the sequence number of the previous slot+1) into the first MU in the next slot (referred to herein as the Start MU) indicating that a record of an update journal with that sequence number should follow in the MUs following the Start MU. Then, upon power loss, the update journal and other system data (i.e., the last update to the L2P table) can be written to the following MUs in the slot along with an indication, saved in the last MU, of completion of recording the update (referred to herein as an End MU). As a result, the update journal and other system data MUs are preceded by a Start MU with the sequence number and timing/debug info, and followed by an End MU with the sequence number. Accordingly, if the process of recording the last update journal is completed successfully, the sequence number recorded in the Start MU of the slot should be the same as the sequence number recorded in the End MU. If, however, the process of recording the last update is interrupted or is not completed, then the sequence number of the Start MU and the End MU will be different. This relationship between the sequence numbers of the Start and End MUs can be used to determine whether the process of recording the last update was completed successfully.

In some embodiments, on power up, an indicator of the active PSMU can be retrieved from a record stored in a system metadata memory area. The system metadata memory area containing the identifier of the active PSMU can reside on another memory device, which may, e.g., be more quickly accessible or have lower latency than the non-volatile memory device e.g., a serial peripheral interface (SPI) flash memory device. The system metadata area can store an identifier of the last active PSMU being used on the non-volatile memory device where the last journal update was supposed to be saved. To locate the last update journal, the active PSMU can be binary-searched to find the slot with the largest sequence number. Then, the MUs in the slot can be read to determine whether the record is valid. As noted earlier, if there is an MU labeled as an End MU and it has the same sequence number as the first MU, then the data recorded in the slot can be considered to be complete and valid. This would, therefore, mean that the recording of the last update journal was completed successfully.

Thus, if a valid last update journal from a preceding power loss is found (i.e., the slot has been determined to have a valid record of the last update journal within it), it can be combined with the last recorded snapshot of L2P table and other update journals to reconstruct the latest L2P table. Because the last update journal contains all of the updates occurring immediately prior to the power loss, the reconstruction process can be sped up. The reconstruction process can be achieved faster by applying the last update journal to the previous update journals and snapshot in order to make the L2P table accurate and current. This sped up reconstruction process may be referred to herein as a fast rebuild. However, if the End MU does not have the same sequence number as the Start MU then the data in that slot can be considered to be invalid and is not reliable to be used for the aforementioned faster rebuild process. In this case, the exhaustive scan of the flash would be needed to rebuild the metadata. Accordingly, in some embodiments, alternative and potentially slower processes for rebuilding the L2P table can be used. For example, in some embodiments, an alternative process can include finding a previous snapshot through a binary search in an area of the non-volatile memory device, then loading a journal for that snapshot, if one exists, and then sequentially scanning areas on the non-volatile memory device where data swapping might have happened to identify the changes that were made after the last snapshot was saved. This process can be referred to herein as a slow rebuild. Furthermore, if at any time during a power up sequence, an uncorrectable error code correction (UECC) error occurs when reading the MUs, the active PSMU where the MUs are located can be marked as defective and replaced with a spare PSMU. In this case, any update journal which may have been recorded in that PSMU should not be relied upon to perform a fast rebuild and a slow rebuild can be performed instead.

Advantages of the present disclosure include but are not limited to reducing the time needed to have power sustained by a capacitor during an APL while still ensuring that the latest changes to the L2P mapping table and system metadata are recorded. The present disclosure further provides the advantage of enabling a quick and accurate rebuilding of the L2P table upon power up. In many situations this permits rapid access by other system components and meets system TTR requirements. Thus, the technical advantages presented by the disclosure are that decreasing the size of a capacitor and its power-sustaining time needed for saving L2P-metadata changes when power loss occurs and speeding up the rebuilding of the L2P table upon power up FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In some embodiments, the memory sub-system 110 includes an asynchronous power loss (APL) management component 113 that can maintain the L2P table in in local memory 119 or volatile memory device 140 along with update journals containing changes to the L2P mapping table. The APL management component 113 can also save the L2P table snapshots, save the update journals, and save the latest changes to L2P mapping data and system metadata to the non-volatile memory device 130. It can also rebuild the L2P tables based on the snapshots, the update journals, and the latest records of changes. The APL management component 113 can perform all or part of the APL management processes described herein. In some embodiments, the memory sub-system controller 115 includes at least a portion of the APL management component 113. In some embodiments, the APL management component 113 is part of the host system 110, an application, or an operating system. In other embodiments, local media controller 135 includes at least a portion of APL management component 113 and is configured to perform the functionality described herein.

The APL management component 113 can periodically save snapshots of L2P table (i.e., snapshots including L2P mapping table and system metadata) residing in local memory 119 or volatile memory device 140 during operation of the memory sub-system 110 to non-volatile memory device 130. The APL management component 113 coupled to the processor 117 and local memory 119 can save the snapshots at a predetermined frequency, which can be based on, for example, the endurance management requirements of the non-volatile memory device 130.

In operation, changes to the L2P table can be maintained as journals of updates (i.e., update journals) in a journal buffer of a volatile memory of a device such as local memory 119 or volatile memory device 140. The update journals can include a plurality of entries with each entry describing or identifying a change made to the L2P table including changes made to system metadata. Upon the fulfilment of a threshold criterion (e.g., a threshold number of journals being collected in the journal buffer, a predetermined period of time between update journals being collected in the journal buffer expiring, or the journal buffer getting full), the APL management component 113 can save the update journals to a dedicated area of the non-volatile memory device. Generally, more than one update journal may be saved to the non-volatile memory device within each of the predetermined time intervals at which the snapshots are saved. This may occur when a sufficient number of changes to the L2P mapping and the system metadata occur to fill up the journal buffer multiple times within such a time interval.

If a loss of power (e.g., an APL) occurs, the APL management component 113 can save the last set of updates made to the L2P table (i.e., the most recent set of changes) as an update journal (i.e., the most recent update journal). Notably, at every power up, the APL management component 113 can initialize a slot of the PSMU of the non-volatile memory device by retrieving (i.e., reading) the sequence number of the previous slot (i.e., the last slot used for writing an update journal) and writing the next incremented sequence number (i.e., one added to the sequence number of the preceding slot used to write a previous update journal in the PSMU) into the first management unit MU of the next slot. With reference to this first MU with the incremented sequence number, when a power loss event occurs, the APL management component 113 can record the most recent update journal into the MUs following the first MU in the slot and write the same incremented sequence number into the MU at the end of the most recent update journal in the slot (i.e., the last MU). This record will result in having an update journal preceded by the first MU having the sequence number and having the update journal followed by the last MU having the same sequence number.

Upon power up after the occurrence of the loss of power, the APL management component 113 can reconstruct the L2P table in the volatile memory (e.g., local memory 119 or volatile memory device 140) based on the snapshot, the previously recorded update journals, and the last update journal recorded upon power loss. In some embodiments, the APL management component 113 can reconstruct the L2P table by locating the last snapshot of the L2P table and the previously recorded update journals and then applying the previously recorded update journals and the most recent update journal to the snapshot of the L2P table. The snapshots, the update journals, and the most recent update journal can each be recorded in a different dedicated area or region on the non-volatile memory device 130. In some embodiments, the dedicated area of the non-volatile memory device 130 can be one or more management units (MUs) or a set of one or more physical super management units (PSMUs).

When power up occurs, the APL management component 113 can begin reconstructing the L2P table by identifying the active PSMU (i.e., the PSMU that was utilized for saving the last update journal), the identifier of which can be retrieved from a system metadata memory area (e.g., a dedicated memory area on the same memory device or another memory device). The APL management component 113 can then check if the active PSMU contains a valid record of the last set of updates of the L2P table. In some embodiments, this check involves comparing the sequence number of the first and last MU (i.e. the first MU and an MU labeled as an End MU or an MU having an end marker) in a slot of the dedicated PSMU where the last update journal was supposed to be recorded. To perform this comparison, the APL management component 113 can search the active PSMU to find a slot with a largest sequence number and checking if the first MU in the slot and the last MU in the slot of the active PSMU have the same sequence number. Because at each power up an MU in the slot is recorded with the next incremented sequence number, the slot with the MU having the largest sequence number should be the slot containing the most recent update journal if one exists. When an update journal is recorded upon a power loss event, an MU with the sequence number is recorded at the beginning and end of the update journal. Accordingly, if the sequence numbers of the first MU and last MU of the slot used to record the update journal are the same, then the data in that slot (i.e., the last update journal containing the last set of changes recorded upon power loss) is considered to be valid, and if the sequence numbers of the first and last MU are different then the data in that slot is considered to be invalid. If the data in the slot with the largest sequence number is determined to be valid (i.e., if a valid latest update journal is found) then, the APL management component 113 can locate the last snapshot and previous update journals and combine the latest update journal with the snapshot and the previous update journals to reconstruct the L2P table in the volatile memory device 130 or the local memory 119. Because the snapshot and the previous update journals were saved prior to the APL, the application of the last update journal to the combination of the snapshot and the previous update journal can result in a current up-to-date L2P table that is reconstructed quickly on power up. Further details with regards to the operations of the APL management component 113 are described below with reference to FIGS. 2-5.

In one embodiment, when a rebuild or a power up has completed, a new MU in the active PSMU can be saved, labeled as aplRebuild, and be given a new sequence number. The presence of this new MU can serve as an indication to perform the APL management process to record the latest set of changes if a power loss occurs and the absence of the new MU can serve as an indication to not perform the APL management process and rely on previously recorded data. In one embodiment, during an APL, the second MU in the active PSMU can be labeled as aplStart with the new sequence number (i.e., the same one as in the first MU) to indicate the beginning of new valid update journal data and can be used to save the system/medium timestamp data. Then, updated entries of the L2P mapping table and other system metadata such as microcontroller (MC) logs and system event logs, can be recorded as raw data in subsequent MUs of the active PSMU. In some embodiments, at the end of these MUs an end marker labeled aplEnd can be written in the last MU to indicate the completion of saving the data during the APL management process.

In an embodiment, on power on, a binary search can be conducted in the PSMU to find the largest sequence number. Then, the MUs of the PSMU can be read to determine whether last APL MU (i.e., the MU labeled aplEnd) following the first MU (i.e., the MU labeled aplRebuild) of the last sequence number has the same sequence number as the first MU. If the last MU has the same sequence number as the last MU, then the data in the slot can be considered valid and the MUs in between the first and last MU can be read and used to perform a fast rebuild. If the sequence number of the last MU and the first MU is different, then the data can be considered invalid and a slower rebuild process including a binary search for the last snapshot of the L2P table can be performed. Notably, if there is no APL and there is an intentional shutdown, then a snapshot that includes all the latest changes to the L2P mapping table and metadata can be saved to the non-volatile memory device and the APL management process is not performed. These and other details of the present disclosure are described below with reference to FIGS. 2-5.

Figure 2:
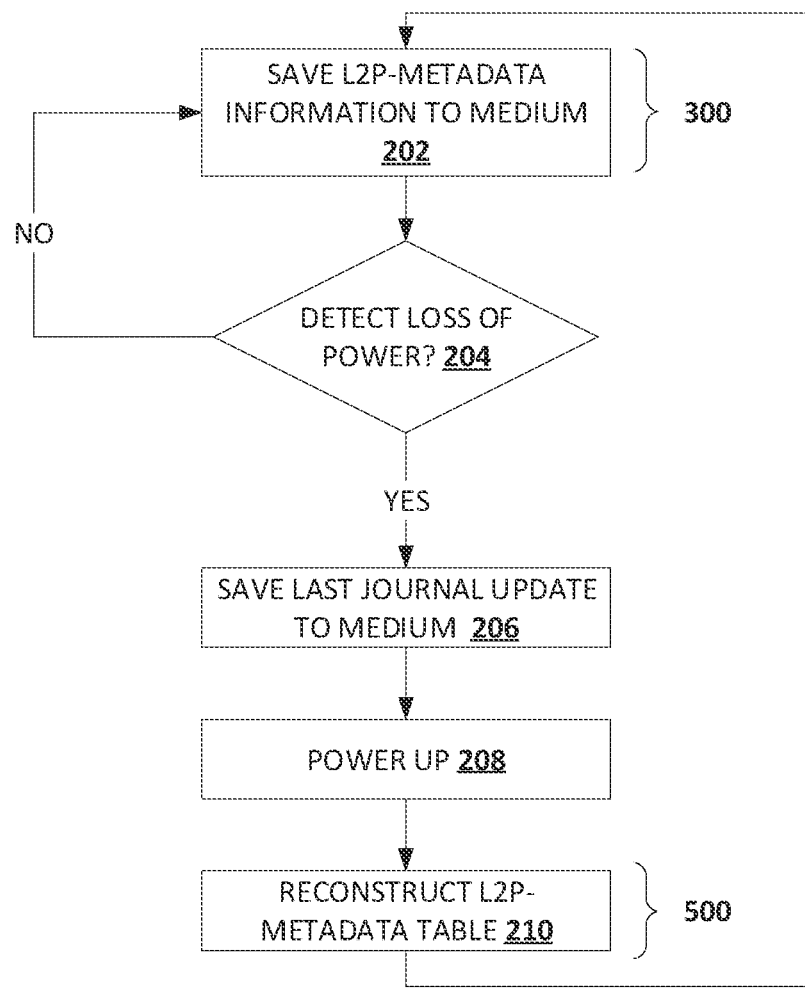
FIG. 2 is a flow diagram of an example method for managing power loss in accordance with some embodiments of the present disclosure.

FIG. 2 is a flow diagram of an example method 200 for managing power loss, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the APL management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing logic can save the L2P-metadata information located in a volatile memory to a non-volatile memory device. The L2P-metadata information can include an L2P mapping table and various types of system data in the form of an L2P table. Saving the L2P-metadata information can include saving it in the form of an L2P table snapshot and can include recording changes to the L2P mapping and system metadata as journals of changes and saving them to the non-volatile memory device. The method 300 of saving the L2P-metadata information is described in more detail with reference to FIG. 3 below.

At operation 204, the processing logic can determine whether a power loss has occurred. A loss of power, such as an asynchronous power loss (APL), can be detected by measuring a voltage drop satisfying a threshold criterion across elements of an electronic system. If a power loss occurs, at operation 206, the processing logic can save the last set of changes made to the L2P-metadata information in the form of a last update journal to a dedicated area of the non-volatile memory device. Generally, a power loss event is preceded by a power up, upon which an MU (e.g., the first MU) in a slot of a dedicated area of a non-volatile memory device can be initialized and have an incremented sequence number written to it and labeled as the first MU. Thereafter, after the detection of the power loss event at operation 204, saving the last set of changes at operation 206 is performed by recording the most recent update journal into the MUs following the first MU in the slot and write the same incremented sequence number into the MU at the end of the most recent update journal in the slot (i.e., the last MU). Accordingly, if the operation 206 is successfully completed, the slot should have an update journal preceded by a first MU having the sequence number followed by the last MU having the same sequence number. If no power loss is detected, the processing logic can continue saving snapshots and collecting changes at operation 202.

At operation 208, power can be restored to the system and the processing logic can begin to reconstruct the L2P table at operation 210. The rebuilding of the L2P table at operation 210 can include finding the latest update journal and combining it with a previously saved snapshot and previously saved update journals. The method 500 of rebuilding the L2P table is described in more detail with reference to FIG. 5 below.

Figure 3:
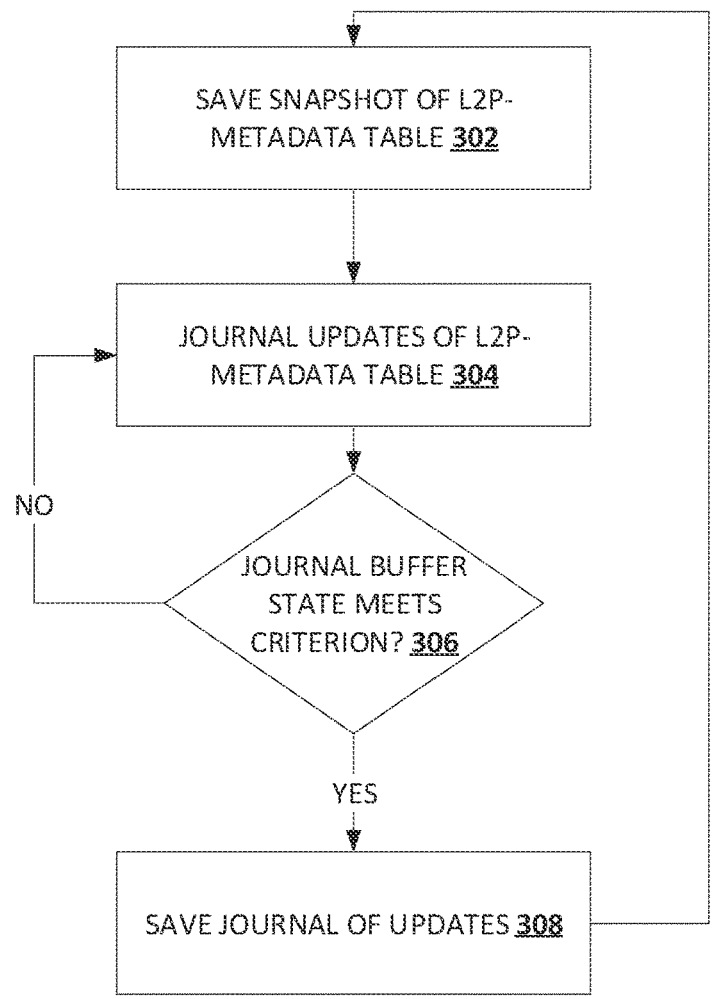
FIG. 3 is a flow diagram of an example method for recording changes to mapping and system data in accordance with some embodiments of the present disclosure.

FIG. 3 is a flow diagram of an example method 300 for recording changes to mapping and system data, in accordance with some embodiments of the present disclosure. The method 300 can be understood to be a method of saving the L2P table. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the APL management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing logic can save a snapshot of the L2P table. Saving the snapshot of the L2P table can include taking the current L2P table located in a volatile memory device and saving an identical copy of it in a dedicated area of a non-volatile memory device. The processing logic at operation 302 can save the snapshot at regular intervals of time that can be predetermined and set prior to the operation. Accordingly, the saving of a snapshot of the L2P table can be performed with a predetermined frequency, at operation 302. Changes can be made to the L2P table in between instances of time when the snapshots of the L2P table are saved.

At operation 304, the processing logic can record the changes to the L2P table as a journal of updates in the volatile memory device. Such update journals can contain entries of changes to the L2P table that include changes to the L2P mapping and system metadata. As changes to the L2P table are made they can be stored as an update journal in a journal buffer of the volatile memory device.

At operation 306, the processing logic can determine whether the state of the journal buffer meets a threshold criterion. Threshold criteria can include having a particular number of update journals, an expiration of a period time after the recording of the previous update journal, or the journal buffer becoming full. If the state of the journal buffer of meets a threshold criterion, at operation 308, the processing logic can save the update journal to a dedicated area on a non-volatile memory device. Until the journal buffer state fulfills the threshold criterion, the processing logic can continue collecting the changes at operation 304. Similarly, after recording the journal update at operation 308, the processing logic can also continue to save the snapshots at operation 302, and collecting the changes at operation 304. Because the journal buffer can meet the threshold criterion (i.e., be in a state that fulfills the threshold criterion at operation 306) multiple times within one of the regular time intervals of operation 302, saving the update journal at operation 308 can occur multiple times within one of those time intervals as well. Consequently, the processing logic can perform operation 308 more than once between each iteration of performing operation 302.

Figure 4:
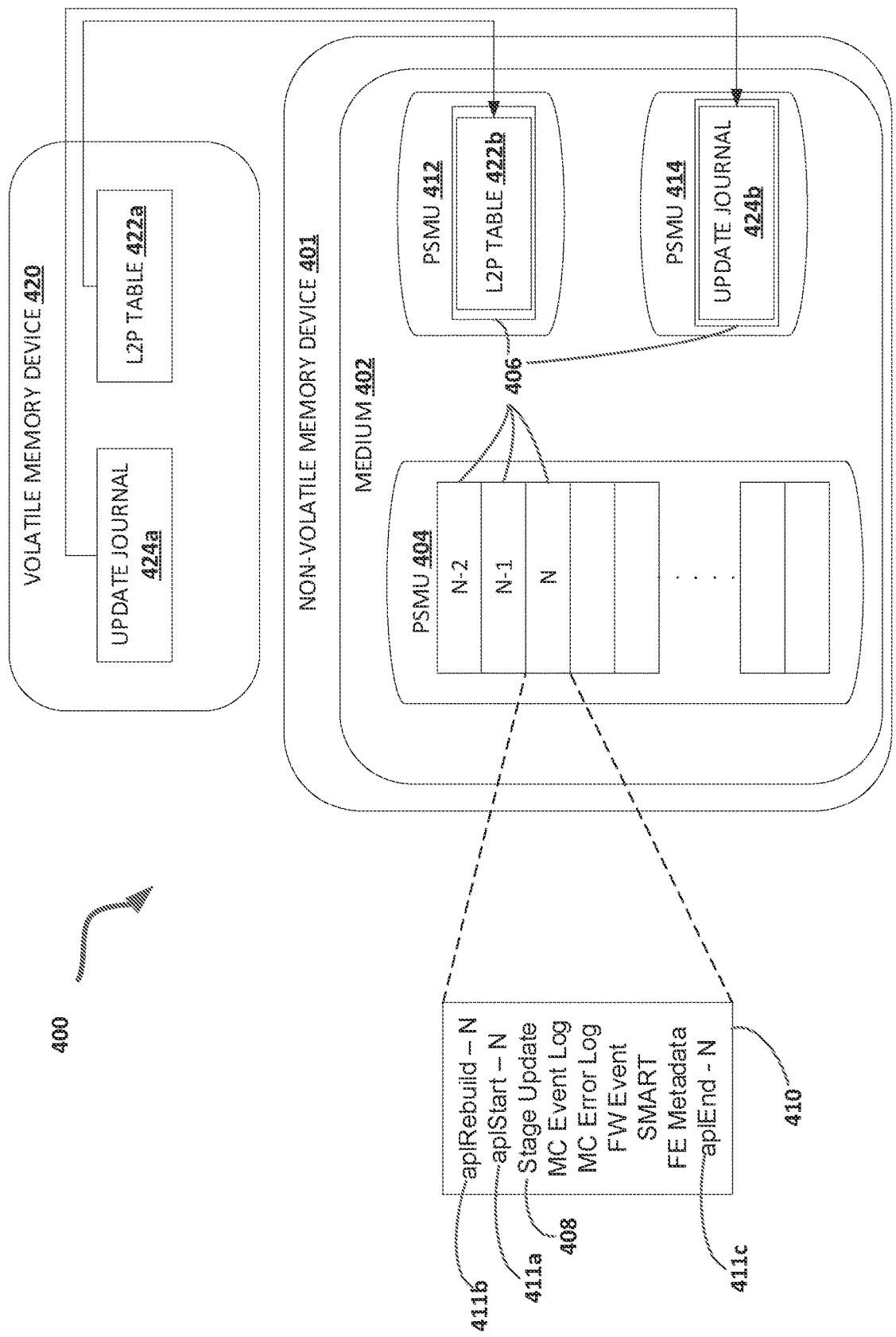
FIG. 4 is a block diagram of a volatile memory device and a non-volatile memory device in accordance with some embodiments of the present disclosure.

FIG. 4 is a block diagram 400 of a volatile memory device 420 and a medium 402 of a non-volatile memory device 401 in accordance with some embodiments of the present disclosure. The volatile memory device 420 can be, local memory 119, a volatile memory device 140, or another memory device. The volatile memory device can contain an L2P table 422a and an update journal 424a of changes to the L2P table 422a.

The medium 402 of the non-volatile memory device 401 can have a dedicated portion or area, such as PSMU 412 and PSMU 414, for saving snapshots of the L2P table 422b and update journals 424b, respectively. For example, another dedicated area can be PSMU 404 that is dedicated for saving update journal upon the occurrence of an APL. The PSMU 404 can include one or more slots 406 each having one or more MUs 408. In one embodiment each PSMU 404, 412, 414, of medium 402 contains thousands of MUs 408. In an active PSMU 404 the MUs 408 can be recorded with a sequence number N which allows the last or latest written MU 408 and/or the latest written slot 406 to be found by looking up the last sequence number. In some embodiments the snapshots of the L2P table, the iterative update journals, and the last update journal can be written to different PSMUs and MUs of the medium. For example an update journal 410 can be recorded over several MUs 408 in a slot 406 that can include a sequence number N, a set of changes to L2P mapping information (also referred to herein as a Stage Update), system logs, and system metadata.

Figure 5:
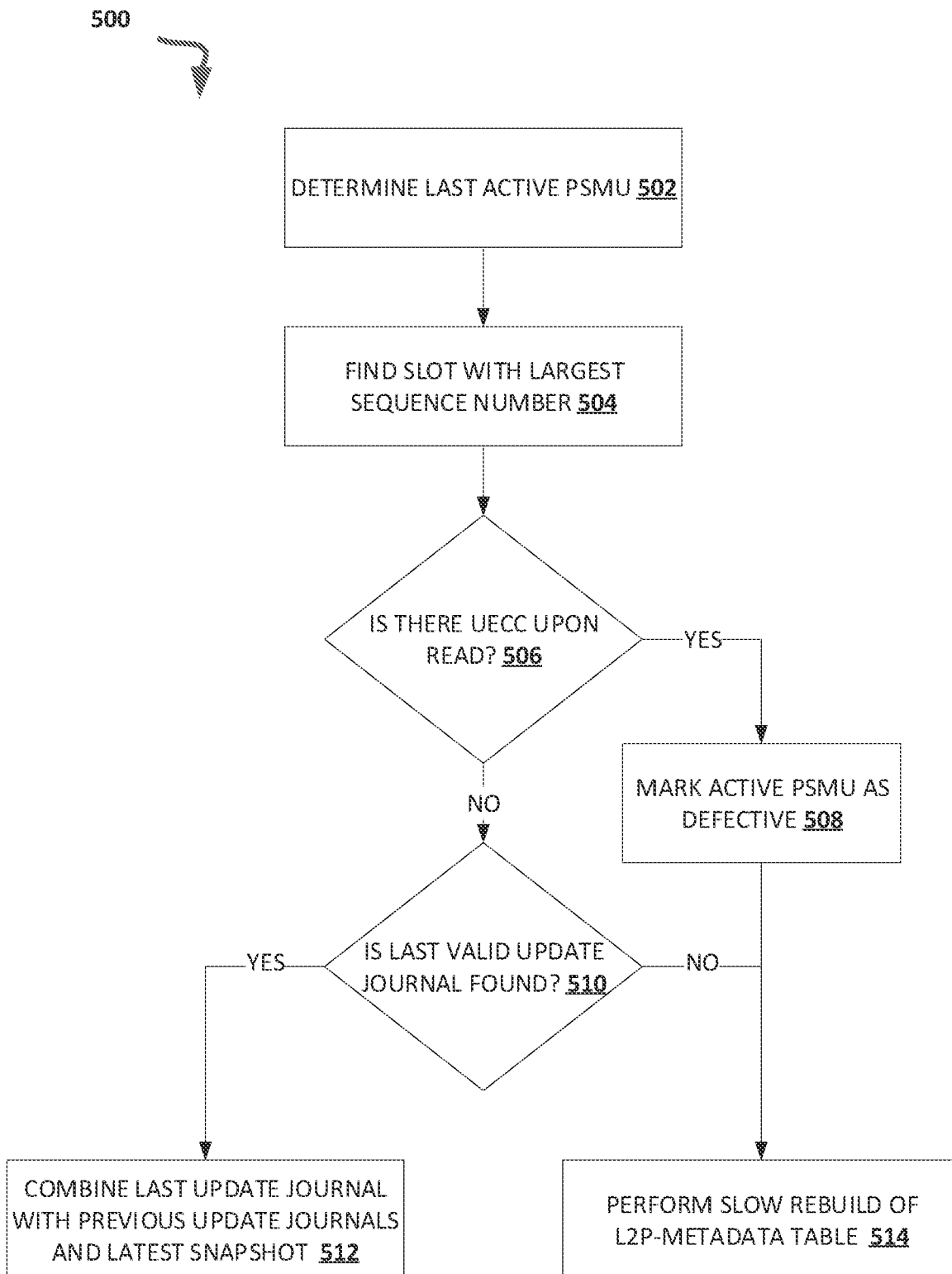
FIG. 5 is a flow diagram of an example method for rebuilding mapping and system data in accordance with some embodiments of the present disclosure.

FIG. 5 is a flow diagram of an example method 500 for rebuilding mapping and system data, in accordance with some embodiments of the present disclosure. The method 500 can be understood to be a method of rebuilding or reconstructing the L2P table. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the APL management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic can identify the last active PSMU 404. Identifying the last active PSMU can be performed by retrieving an identifier of the last active PSMU from a system metadata memory area (e.g., a dedicated memory area on the same memory device or another memory device). The last active PSMU 404 on the medium 402 of a non-volatile memory device 130 can include the latest record of changes made to L2P-metadata information (i.e., the most recent update journal 410).

At operation 504, the processing logic can find, in the active PSMU 404, the slot 406 with largest sequence number. To find the last slot that was written to, the processing logic can perform a binary search in the active PSMU 404 to find the slot containing MUs 408 with the largest sequence number. If the operation 206 of saving the most recent update journal described earlier was completed successfully, this sequence number should correspond to the sequence number of the MUs of the most recent update journal.

At operation 510, the processing logic can determine whether the latest update journal 408 is found in the slot 406 of the PSMU 404. The processing logic can read the first MU 411b and the last MU 411c in the slot 406 and compare whether the first MU 411b and the last MU 411c have the same sequence number N. In one embodiment, the first MU 411b and the last MU 411c in a sequence of MUs comprising an update journal 410 in the slot 406 can be identified based on a label or other indication. If the sequence number N of the first MU 411a, 411b and the last MU 411c is the same then the data of the slot 406 can be considered to be valid and if it is not the same then the data can be considered not to be valid. If the data in the slot with the largest sequence number is valid then it can be considered to contain the most recent update journal. If the most recent update journal is found (i.e., the latest set of changes recorded during an APL and immediately prior to the complete loss of power is successfully saved in the slot with the largest sequence number), at operation 512 the processing logic can combine the last update journal, with the previously recorded update journals, and the latest snapshot on the non-volatile memory device 130 to rebuild the L2P table.

At operation 512, the processing logic can find the last snapshot that was saved as well as the previous update journals and combine them with the update journals in slot 406 with the largest sequence number in the active PSMU 404 to reconstruct, in the local memory 119 or the volatile memory device 140, an up-to-date current L2P table. To combine the snapshot and the update journals, the processing logic can apply the entries of changes in the previous update journals to the latest snapshot of the L2P table and then apply the entries of changes in the most recent update journal to obtain the reconstructed L2P table. However, if the last valid journal update is not found in the PSMU 404, because, for example, the sequence number of the first MU 411a, 411b and the last MU 411c in the slot 406 with the largest sequence number is not the same, then an alternative rebuilding process can be performed at operation 514.

Because the metadata of the L2P table is duplicated on the non-volatile memory device, an exhaustive search and scan of the non-volatile memory device can be performed to reconstruct the L2P table. Accordingly, at operation 514, the processing logic can perform a binary search for a previously saved snapshot and find a journal update for that snapshot. Thereafter, the processing logic can scan areas of the non-volatile memory device where data swapping or changes may have occurred to identify the latest changes to the data mapping. This alternative rebuild process of operation 514 should be understood to be a version of the slower rebuild process described earlier. Furthermore, at any point when the MUs 408 of the PSMU 404 are read, the processing logic can, at operation 506, determine that there is a UECC error. If a UECC error occurs, the data of the update journal cannot be accurately read and cannot be relied upon for L2P table reconstruction. If there is a UECC error when an MU is read, then, at operation 508, the processing logic can mark the PSMU where the MU is located as defective and replace it with a spare PSMU. If the UECC error occurs during a read of an MU of a slot with the latest sequence number, the data in the slot is not relied upon for rebuilding the L2P table, and instead, the slow rebuild of operation 514 described above can be performed.

Figure 6:
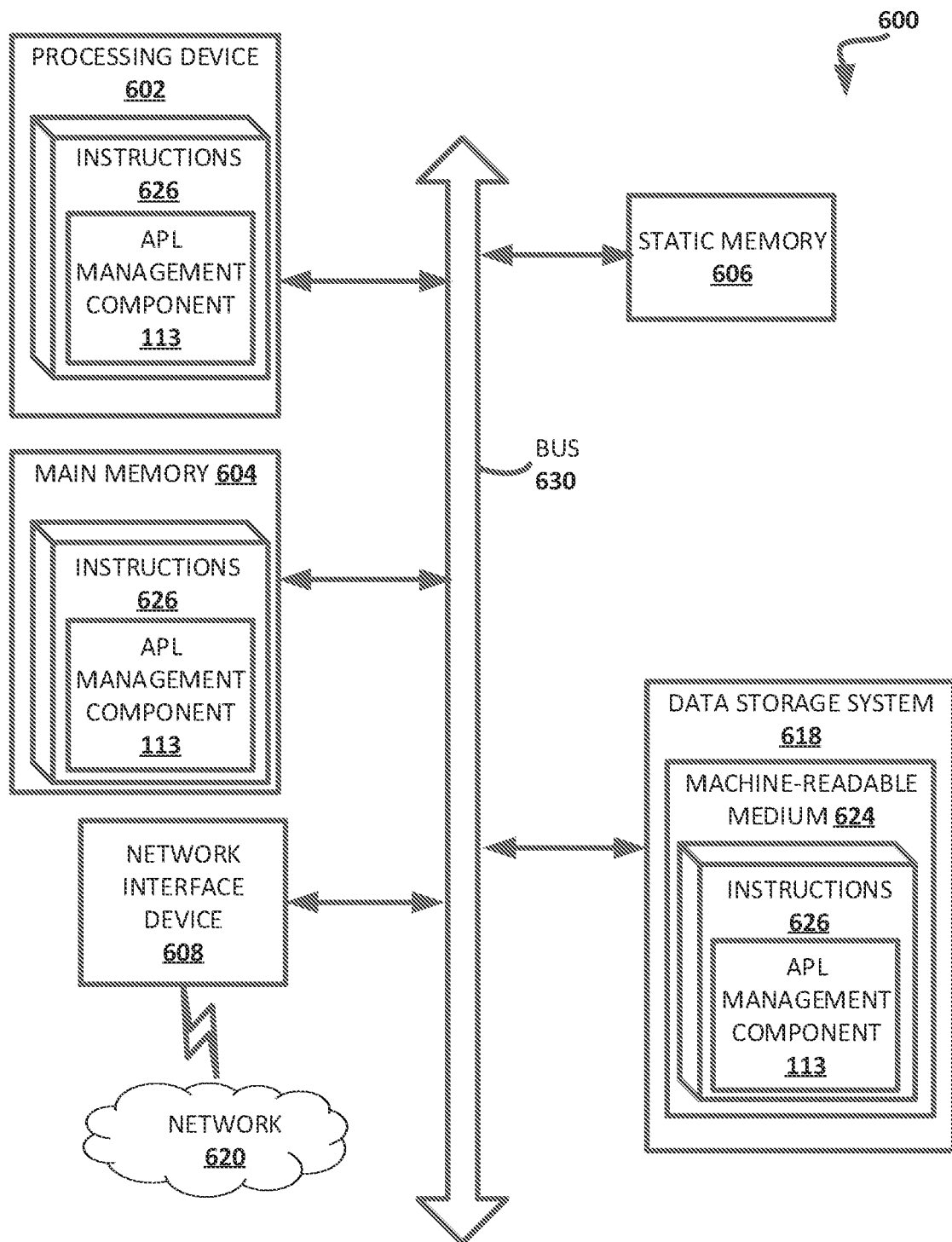
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the APL management component of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an APL management component (e.g., the APL management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a plurality of memory devices comprising a volatile memory device and a non-volatile memory device; and
   a processing device, operatively coupled with the plurality of memory devices, to perform operations comprising:
   saving a snapshot of a logical-to-physical (L2P) table to a non-volatile memory device;
   responsive to detecting a power up event, initializing a slot of a physical super management unit (PSMU) in a portion of a dedicated area of the non-volatile memory device by writing a sequence number into a first management unit (MU) of the slot in the portion of the dedicated area wherein the sequence number identifies a record of an update journal;
   maintaining at least one journal of updates of the L2P table comprising a plurality of entries wherein each entry records a change to the L2P table,
   responsive to a parameter of a journal buffer of the volatile memory device satisfying a threshold criterion, saving the at least one journal of updates of the L2P table to the non-volatile memory device;
   responsive to detecting a power loss event, retrieving the sequence number from the dedicated area; and
   saving a most recent set of updates of the L2P table to the portion of the dedicated area of the non-volatile memory device, wherein the portion of the dedicated area is identified by the sequence number.

2. The system of claim 1, wherein saving the snapshot is performed at a predetermined frequency.

3. The system of claim 1, wherein saving the most recent set of updates of the L2P table comprises recording a most recent update journal into MUs following the first MU of the slot.

4. The system of claim 1, wherein saving the most recent set of updates of the L2P table comprises writing the sequence number into a last MU used for the most recent update journal.

5. The system of claim 1, wherein, after saving the most recent set of updates of the L2P table, the dedicated area comprises a slot with the first MU having the sequence number, followed by an update journal, and followed by a last MU having the sequence number.

6. The system of claim 1, wherein the operations further comprise, responsive to detecting a power up event following the power loss event, reconstructing the L2P table using the most recent set of updates of the L2P table, the at least one journal of updates, and the snapshot.

7. The system of claim 6, wherein reconstructing the L2P table comprises applying the at least one journal of updates and the most recent set of updates to the snapshot.

8. A method comprising:
   responsive to detecting a power loss, saving, by a processing device, a most recent update journal of a logical-to-physical (L2P) table to a non-volatile memory device;
   responsive to detecting a power up event following the power loss:
   locating a snapshot of the L2P table;
   locating at least one update journal of the L2P table; and
   locating the most recent update journal of the L2P table on the non-volatile memory device by determining whether a first management unit (MU) of a portion of the non-volatile memory device has a same sequence number as a last MU of the portion of the non-volatile memory device in a dedicated area on the non-volatile memory device; and
   reconstructing the L2P table on a volatile memory device by applying the most recent update journal of the L2P table and the at least one update journal of the L2P table to the snapshot of the L2P table.

9. The method of claim 8, wherein locating the most recent update journal of the L2P table comprises identifying an active physical super management unit (PSMU) comprising the most recent update journal of the L2P table.

10. The method of claim 9, wherein identifying an active PSMU comprising the most recent update journal comprises determining whether the active PSMU contains a valid record of the most recent update journal of the L2P table.

11. The method of claim 10, wherein determining whether the active PSMU contains the valid record of the most recent update journal comprises searching the active PSMU to find a slot with a largest sequence number.

12. The method of claim 11, wherein determining whether the active PSMU contains the valid record of the most recent update journal further comprises checking whether the first MU and the last MU of the active PSMU have the same sequence number.

13. The method of claim 8, wherein reconstructing the L2P table comprises first applying the at least one update journal of the L2P table to the snapshot of the L2P table and then applying the most recent update journal of the L2P table to the snapshot of the L2P table.

14. The method of claim 8, wherein the at least one update journal of the L2P table is recorded prior to the most recent update journal.

15. A non-transitory computer-readable storage medium comprising instructions that, when executed by a processing device, cause the processing device to perform operations comprising:
responsive to detecting a power loss, saving, by a processing device, a most recent update journal of a logical-to-physical (L2P) table to a non-volatile memory device;
responsive to detecting a power up event following the power loss;
locating a snapshot of the L2P table:
locating at least one update journal of the L2P table; and
locating the most recent update journal of the L2P table on the non-volatile memory device by determining whether a first management unit (MU) of a portion of the non-volatile memory device has a same sequence number as a last MU of the portion of the non-volatile memory device in a dedicated area on the non-volatile memory device; and
reconstructing the L2P table on a volatile memory device by applying the most recent update journal of the L2P table and the at least one update journal of the L2P table to the snapshot of the L2P table.

16. The non-transitory computer-readable storage medium of claim 15, wherein locating the most recent update journal of the L2P table comprises identifying an active physical super management unit (PSMU) comprising the most recent update journal of the L2P table.

17. The non-transitory computer-readable storage medium of claim 16, wherein identifying an active PSMU comprising the most recent update journal comprises determining whether the active PSMU contains a valid record of the most recent update journal of the L2P table.

18. The non-transitory computer-readable storage medium of claim 17, wherein determining whether the active PSMU contains the valid record of the most recent update journal comprises searching the active PSMU to find a slot with a largest sequence number and checking whether a first management unit (MU) and a last MU of the active PSMU have the same sequence number.

19. The non-transitory computer-readable storage medium of claim 15, wherein the at least one update journal of the L2P table is recorded prior to the most recent update journal.

\* \* \* \* \*